3,086,854
METHOD FOR THE CONTROL OF PLANT GROWTH
John Harvey, Jr., Brandywine Hundred, Del., assignor to E. I. du Pont de Nemours and Company, Wilmington, Del., a corporation of Delaware
No Drawing. Filed Feb. 5, 1959, Ser. No. 791,266
1 Claim. (Cl. 71—2.5)

This invention relates to compositions and methods for controlling plant growth employing alpha-terthienyl and its alkyl and halogen derivatives.

It has been discovered that the alpha-terthienyl compounds represented by the following formula possess outstanding plant growth regulating activity:

(1)
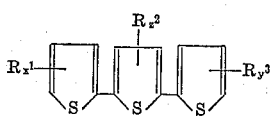

wherein $R^1$, $R^2$ and $R^3$ can be the same or different and are selected from the group consisting of halogens, nitro, or monovalent lower aliphatic radicals, preferably of from 1 through 4 carbon atoms. Likewise, $x$ and $y$ can be the same or different and are a number from 0 through 3, that is 0, 1, 2 or 3, and $z$ is a number from 0 through 2, that is 0, 1 or 2. Preferably $R^1$ and $R^3$ are in the alpha position with respect to the sulfur atom.

These compounds are characterized by rapid contact and pre-emergence herbicidal activity on both grasses and broadleaf plants. They possess the valuable property of being translocated within higher plants such as cotton, and in many instances have unusual selectivity. They are also effective cotton defoliant agents.

These compounds are moderately high melting solids, soluble in acetone, ether, chlorinated hydrocarbons, and hydrocarbons, slightly soluble in alcohol, and essentially insoluble in water.

The halogen derivatives can be prepared by conventional halogenation, preferably chlorination of the corresponding alpha-terthienyl or aliphatic substituted alpha-terthienyl.

Also these compounds can be prepared by the reaction of saturated or unsaturated hydrocarbons containing from 12 to 20 carbon atoms preferably $C_{12}$ to $C_{15}$ inclusive in chain lengths with sulfur. For example alpha-terthienyl can be prepared in accordance with the following reaction:

(2)
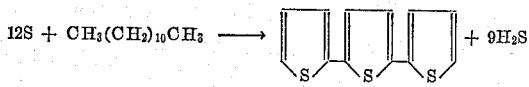

For this reaction, 12 moles of sulfur are required per mole of hydrocarbon. No solvent is required, and the reaction, can be carried out at 200 to 600° C., preferably in the vapor phase at 450° C. to 600° C. A vulcanizing accelerator type catalyst such as mercaptobenzothiazole can be present. When the reaction is carried out in the liquid phase at 200 to 450° C., pressure is required to keep both components of the reaction mixture liquid. Rapid agitation should be employed. Reaction times are on the order of 1 to 16 hours, less time being required at the higher temperatures. At 450° to 600° C. temperatures in the vapor phase, a short contact time, i.e., 1 to 10 minutes, and rapid quenching of the product are required.

Nitro substituted compounds of Formula 1 (which can also contain the aliphatic and halogen substituents) possess a distinct type of herbicidal activity. They have extremely rapid desiccating action when applied to plant foliage. These nitro-substituted terthienyls can be prepared by adding fuming nitric acid in acetic acid to a dispersion of an alpha-terthienyl compound where the sum of $x$, $y$, and $z$ is less than 8, so that nuclear nitration can take place. The reaction is carried on in an inert non-aqueous liquid medium such as acetic anhydride, the addition being made at such a rate as to keep the temperature of the reaction mixture below about 25° C. The reaction mixture is then allowed to stand for several hours at room temperature, after which it is diluted with cold water. The nitrated product can be recovered by filtration from the aqueous acetic acid.

The alpha-terthienyl compounds represented by Formula 1 can be applied for plant growth regulation in any of a variety of compositions, all of which are characterized by comprising the compound and an agent which assists in the application of the compound for the intended purpose. Thus, the compounds will be extended with a carrier material or conditioning agent of the kind used and commonly referred to in the art as a herbicidal adjuvant or modifier. Such adjuvants, modifiers, carrier materials, and conditioning agents are generically included within the term "plant growth regulant application agents," which as used herein will be understood to be limited, composition-wise, to agents selected from the group consisting of dry, finely, divided, inert solids, surface-active agents, and organic liquids having a boiling point above about 100° C.

The proportion of plant growth regulant application agent present in a composition of the invention can be widely varied, depending upon its effectiveness in conditioning the active ingredient for application. When said agent is a surface-active agent, as little as 0.1% by weight exhibits an observable effect. On the other hand, with the dry, inert, finely divided solids, 10%, and with the organic liquids, 50% are practical minimums, although somewhat less can be used in special circumstances. There is, of course, no maximum on the amount of the application agent other than that dictated by the economics of the bulk-handling involved. Ordinarily, there will be at least 0.5% of the active ingredient present.

Solid formulations can be prepared with inert powders as the plant growth regulant application agent. The formulations thus can be homogeneous powders that either can be used as such, diluted with inert solids to form dusts, or suspended in a suitable liquid medium for spray application. The powders usually comprise active ingredient admixed with a conditioning agent. Natural clays (either absorptive such as attapulgite or relatively non-absorptive such as china clays), diatomaceous earth, walnut shell flour, redwood flour, synthetic fine silica, calcium silicate and other inert solid carriers of the kind conventionally employed in powder fungicidal compositions can be used. The active ingredient usually makes up from about 5 to 90% of these powder compositions. The solids ordinarily should be very finely divided and should have a particle size below about 50 microns and preferably below about 20 microns. For conversion of the powders to dusts, talc, pyrophyllite, tobacco dust, volcanic ash and other dense, rapid-settling inert solids customarily are used.

Liquid compositions including the active compounds above described can be prepared by admixing the compound with an organic liquid having a boiling point above 100° C. Organic liquids of lower boiling point should not be used because when sprayed from a herbicide spray nozzle such liquids of lower boiling point tend to volatilize undesirably. Furthermore, lower boiling organic liquids often present a serious fire hazard.

The active compound can be either in solution or in suspension in the liquid medium. Typical of the liquid media commonly employed are kerosene, Stoddard solvent, xylene, alcohols having the specified boiling point, alkylated naphthalene, diesel oil and aromatic and aliphatic herbicidal oils, glycols and ketones such as diisobutyl ketone and cyclohexanone, etc. Ordinarily the boiling point of the liquid will not be above 400° C. The active ingredient usually makes up from about 0.5 to 95% of these liquid compositions. Some of these compositions are designed to be used as such, and others to be extended with large quantities of water.

Compositions in the form of wettable powders or liquids can also include one or more surface-active agents such as wetting, dispersing or emulsifying agents. Thus mixtures of the above liquids with the active compounds can contain an emulsifying agent to make an emulsifiable oil composition. The surface-active agents of the liquid or dry compositions cause them to disperse or emulsify easily in water to give aqueous sprays.

The surface-active agents employed can be of the anionic, cationic or nonionic type. They include, for example, sodium oleate, sulfonated petroleum oils, alkyl aryl sulfonates, sodium lauryl sulfate, polyethylene oxides, lignin sulfonates, and other surface-active agents. A detailed list of such agents is set forth in an article by McCutcheon in "Soap and Chemical Specialties," volume 31, No. 7, pages 50–61; No. 8, pages 48–61; No. 9, pages 52–67; and No. 10, pages 48–67 (1955).

The compounds can be applied in compositions of the type shown in Jones U.S. Patent 2,412,510 in which an active compound of the invention replaces the active materials of that patent in the composition shown and in like amounts. Similarly any of the carriers, additives or surface-active agents there named or referred to can be used.

The method of controlling the growth of plants in accordance with the present invention comprises applying an alpha-terthienyl compound of the type represented by Formula 1, ordinarily in a herbicidal composition such as those described above, to a locus or area to be protected from undesirable plant growth. The active compound is, of course, applied in sufficient amount to exert the desired herbicidal or other plant growth regulant action. The application can be made directly upon the locus or area and the vegetation thereon during the period of infestation. Alternatively, the application can be made in advance of an anticipated weed infestation.

The dosage employed can be determined readily by those skilled in the art by conventional techniques. It is, of course, dependent upon the particular active ingredient employed, the nature of the formulation used, the type of treatment, the type of vegetation to be controlled, climatic conditions and the like. In general the amount of active ingredient applied will be in the range of 0.1 to 80 pounds per acre. When used as a soil sterilant to give prolonged herbicidal activity in the soil, a dosage of about 40 to 80 lb./acre of active ingredient is employed. Pre-emergence herbicidal control of weeds in field crops is ordinarily obtained using a dosage of 1 to 8 lb./acre. When used as a contact herbicide, a dosage of about 1 to 50 lb./acre, preferably from 2 to 10 lb./acre is employed. When used as a cotton defoliant, application at a rate of about 2 to 16 lb./acre applied to the foliage ordinarily is used. When used to control deep-rooted perennial weeds, dosages of about 20 to 80 lb./acre are ordinarily used.

In order that the invention can be better understood, the following examples are given in addition to those set forth above:

Example 1

Five hundred fifteen whole fresh plants of *Echinops sphaerocephalus* (512 lb.) are ground in a Mikropulverizer with ½" screen using direct feed with water. The aqueous slurry is centrifuged, and the filtrate discarded. The solids are extracted twice with acetone. After the second extraction, the solids are found to be inactive and are discarded. The active acetone extract (1,385 lb.) is concentrated under reduced pressure to an essentially aqueous slurry (212 lb.).

The aqueous slurry is concentrated to about one-half its volume in a flash evaporator, and extracted batchwise with ether in a continuous liquid-liquid extractor. The combined ether extracts are dried, and evaporated to a greenish-black gum (422 g.).

The ether-soluble gum is dissolved in ether and filtered batchwise through columns of neutral chromatographic aluminum oxide (Brockmann Grade I). A broad orange band that exhibits a blue fluorescence under ultra-violet light passes readily through the column and is washed into the effluent with reagent grade chloroform. The amount of material put through each column is just sufficient to load the column with the green bands of chlorophyll. The herbicidally active principle is recovered on evaporation of the effluent: product, an orange oil, wt. 247 g.

This product is dissolved in a minimum amount of benzene and chromatographed batchwise on columns which contain neutral alumina (Grade I) equal to about thirty times the weight of the sample. The alpha-terthienyl forms a yellow to organge band with a blue fluorescence under ultra-violet light that is washed into the effluent on development of the column with benzene (3–5 times the volume required to wet the column). Evaporation of the solvent from this fraction gives 140 g. orange oil, which partially crystallizes on standing in the refrigerator.

The partially crystalline effluent fraction is triturated with boiling methanol in which one-tenth of the material is soluble. After cooling of the solution, yellow needles deposit which are purified by recrystallizations from methanol. The final product is pale yellow needles or platelets, which exhibit a brilliant blue fluorescence under ultra-violet light. The product melts at 92–93° C., recrystallizes on cooling, and remelts at 92–93° C. Prior to the final recrystallization, the product exhibits the same melting characteristics.

Example 2

To a solution of 27 g. (0.4 mole) fuming nitric acid in 300 ml. acetic acid cooled to 10° C. is added a dispersion of 83 g. (0.33 mole) alpha-terthienyl in 300 ml. acetic anhydride at such a rate as will keep the temperature of the reaction mixture below 25° C. When all the alpha-terthienyl has been added the mixture is allowed to stand at room temperature for twelve hours, after which it is poured into one liter of cracked ice with stirring. The nitrated product is recovered by filtration from the aqueous acetic acid.

Example 3

170 g. (1 mole) n-dodecane and 384 g. (12 moles) sulfur are heated together at a temperature of 215° C. in the presence of 5 g. mercaptobenzothiazole for a period of 16 hours. The reaction mixture at the end of this time contains alpha-terthienyl which may be isolated by chromatographic absorption on alumina, or may be used without purification for the purposes of this invention.

Example 4

A hydrocarbon fraction containing hydrocarbons tabulated below as the "reactant" is heated with sulfur in accordance with the procedure of Example 3 by using molecular equivalent quantities of the listed reactants in place of the n-dodecane to give a reaction product in which the terthienyl compounds tabulated below as "product" could be shown to be present by chromatographic adsorption on alumina as described in Example 3.

| Reactant | Product |
| --- | --- |
| 3,4,7,8,11,12-octamethyltetradecane | 1,2,3,4,5,6,7,8-octamethylterthienyl. |
| 3,4,7,11,12-heptamethyltetradecane | 1,2,3,5,6,7,8-heptamethylterthienyl. |
| 3,4,11,12-tetramethyltetradecane | 1,2,3,6,7,8-hexamethylterthienyl. |
| 7-methyltetradecane | 1,4,8-trimethylterthienyl. |
| 3-ethyldodecane | 3-ethylterthienyl. |
| hexadecane | 1-butylterthienyl. |
| tetradecane | 1,8-dimethylterthienyl, 1-ethylterthienyl, 1-vinylterthienyl. |
| pentadecane | 1-methyl-8-ethylterthienyl. 1-methyl-8-vinylterthienyl. 1-propylterthienyl. |
| 2-methyldodecane | 1-(2-methylvinyl)terthienyl. 2-methylterthienyl. |

Example 5

The following wettable powder compositions are prepared by dry mixing the components in a ribbon blender and passing the mixture through a micropulverizer until the material is substantially all below 50 microns in particle size.

|  | Percent |
| --- | --- |
| A. Alpha-terthienyl | 50 |
| Alkyl naphthalene sulfonate Na salt | 1 |
| Low viscosity methyl cellulose | 0.25 |
| Attapulgite | 48.75 |

This composition is applied at the rate of 8 lb./acre (active ingredient) in 100 gallons of water as a pre-emergence treatment to a field planted in corn. Excellent control of annual broadleaf weeds and grasses is obtained.

This composition is also applied in 200 gallons of water at the rate of 30 lb./acre active ingredient. The active compound is found to translocate in plants giving excellent control of deep-rooted perennial weeds such as bindweed and evening primrose.

|  | Percent |
| --- | --- |
| B. 1,8-dibromo-terthienyl | 50 |
| Polyoxyethylene esters of mixed fatty and resin acids concreted with urea | 2 |
| Diatomaceous silica | 48 |

This formulation is extended with water (400 gallons per acre) and applied at the rate of 80 lb./acre active ingredient to a heavy infestation of annual perennial broadleaf and grass species. Excellent kill of vegetation is evident for an extended period.

|  | Percent |
| --- | --- |
| C. 1,8-dichloro terthienyl | 50 |
| Oleic acid ester of sodium isethionate | 1 |
| Sodium lignin sulfonate | 1 |
| Synthetic fine silica | 48 |
| D. 1,4,8 - trimethylterthienyl | 50 |
| Alkyl naphthalene sulfonate Na salt | 1 |
| Low viscosity methyl cellulose | 0.25 |
| Attapulgite | 48.75 |
| E. 4-methyl-1,8-dichloroterthienyl | 50 |
| Polyoxyethylene esters of mixed fatty and resin acids concreted with urea | 2 |
| Diatomaceous silica | 48 |
| F. 1-nitroterthienyl | 50 |
| Oleic acid ester of sodium isethionate | 1 |
| Sodium lignin sulfonate | 1 |
| Synthetic fine silica | 48 |
| G. 1-nitro-2,3,4,5,6,7,8-heptamethylterthienyl | 50 |
| Alkyl naphthalene sulfonate Na salt | 1 |
| Low viscosity methyl cellulose | 0.25 |
| Attapulgite | 48.75 |
| H. 1-chloro-8-nitroterthienyl | 50 |
| Polyoxyethylene esters of mixed fatty and resin acids concreted with urea | 2 |
| Diatomaceous silica | 48 |

Example 6

The liquid reaction mixture of Example 3, stripped of excess solvent to about 50% alpha-terthienyl is mixed directly, without purification, with the emulsifier to yield an emulsifiable oil suitable for dilution with water.

|  | Percent |
| --- | --- |
| A. Reaction mixture of preparation Example 3 containing excess n-dodecane with alpha-terthienyl | 90 |
| Mixed polyoxyethylene esters of fatty acids and oil soluble petroleum sulfonates | 10 |

This composition is extended with water (400 gallons per acre) and applied at the rate of 60 pounds per acre (active ingredient) by means of a special built railroad spray car along a railroad right-of-way. Outstanding control of undesirable vegetation is obtained.

Similar herbicidal compositions are prepared using the products obtained in Example 4, by replacing the active ingredient of the above formulation with an equal weight of the products of Example 4. These compositions give similar herbicidal results.

Also the reaction products of Example 4 are formulated into a plant growth control composition as follows:

|  | Percent |
| --- | --- |
| B. Reaction mixture of preparation Example 4 containing alkylated terthiophenes and excess alkylated n-dodecane | 50 |
| Diesel oil | 50 |

These compositions can be further diluted with diesel oil or other aromatic herbicidal oils and sprayed directly on undesirable vegetation.

These products are also well suited for use as cotton defoliants. When sprayed onto cotton at a 3% concentration of active ingredient in diesel oil, excellent defoliation is obtained.

Example 7

Dust compositions are prepared by first blending the active material and the minor diluent and micropulverizing and then reblending with the major diluent to yield a dust suitable for direct application with dusting equipment. The following compositions are prepared in accordance with this method:

|  | Percent |
| --- | --- |
| A. Nitrated reaction product of preparation Example 2 | 10 |
| Attapulgite | 30 |
| Micaceous talc | 60 |

This dust composition is applied at the rate of 800 lbs./acre of the formulated product by hand to mowed grass stubble in a warehouse area. Good control of such undesirable grasses as crabgrass, foxtail, barnyard grass cheat, rough pigweed, and lambs quarter is obtained.

|  | Percent |
| --- | --- |
| B. Alpha-terthienyl | 20 |
| Diatomaceous silica | 20 |
| Pyrophillite | 60 |
| C. 1-isopropylterthienyl | 10 |
| Synthetic calcium silicate | 10 |
| Tobacco dust | 80 |
| D. 1,8-dichloroterthienyl | 10 |
| Synthetic Pine silica | 5 |
| Volcanic ash | 85 |

| | Percent |
|---|---|
| E. 3-ethylterthienyl | 25 |
| Kaolin | 25 |
| Micaceous talc | 50 |

By way of further examples of the herbicidal compositions of the present invention and their use in controlling the growth of plants, the compounds listed below are substituted in equal amounts by weight for the active ingredients in the compositions of the above examples. These compositions when used in accordance with the procedure of the above examples, give similar control of plant growth.

1,8-dichloro-2-nitro-3,4,5,6,7-pentamethylterthienyl
1,8-dinitroterthienyl
1,2,3,4,5,6,7,8-octachloroterthienyl
1,8-dimethyl-, 3,4,5,6,7-hexachloroterthienyl
1,8-di-isopropylterthienyl
1,8-divinylterthienyl This application is a continuation in part of my copending application Serial No. 639,213, filed February 11, 1957, now abandoned.

I claim:
The method for the control of plant growth comprising applying to the locus to be treated, in an amount sufficient to effect said plant growth control, a compound represented by the following formula

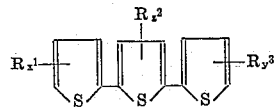

wherein $R^1$, $R^2$ and $R^3$ are substituents on the respective rings and are selected from the group consisting of bromo, chloro, nitro and monovalent lower alkyl groups, $x$, $y$, and $z$ represent the number of said substituents on the respective rings and $x$ and $y$ are numbers from 0 through 3, and $z$ is a number from 0 through 2.

References Cited in the file of this patent

Meisel et al.: "Journal of American Chemical Society," vol. 72, pp. 1910–1912, May 1950.

Steinhopf et al.: Justus Liebigs Annalen der Chemie, vol. 546, pp. 180–199 (1941).